United States Patent

[11] 3,604,543

| [72] | Inventor | Charles A. Glaspell<br>Pleasant Valley Rd., Fairmont, W. Va. 26554 |
|---|---|---|
| [21] | Appl. No. | 12,045 |
| [22] | Filed | Feb. 17, 1970 |
| [45] | Patented | Sept. 14, 1971 |

[54] THROTTLE STOP RESPONSIVE TO BRAKE FAILURE
5 Claims, 3 Drawing Figs.

[52] U.S. Cl. .................................................. 192/3 R, 188/345, 180/82
[51] Int. Cl. ............................................... F16d 67/00
[50] Field of Search .......................................... 192/3

[56] References Cited
UNITED STATES PATENTS
2,229,056 1/1941 Dick ............................. 192/3 R
2,459,938 1/1949 Higgens ......................... 192/3 R
3,498,426 3/1970 Nakano ......................... 192/3 R X Primary Examiner—Benjamin W. Wyche
Attorney—Victor J. Evan & Co.

ABSTRACT: A safety system for dual brakes of a type having dual master cylinders for operation of the front and rear brakes independently. A compensating cylinder connects the front and rear brake lines so that upon normal operation of the brakes the piston thereof is centered. When either brake system fails the piston moves to the end of the compensating cylinder due to the lack of pressure at that end and a stop member is released by the piston to stop the throttle valve from opening beyond a point at which relatively low speed of the vehicle will be attained.

PATENTED SEP 14 1971 3,604,543

INVENTOR.
CHARLES A. GLASPELL
BY Victor J. Evans &Co.
ATTORNEYS.

3,604,543

THROTTLE STOP RESPONSIVE TO BRAKE FAILURE

BACKGROUND OF THE INVENTION

Field of the Invention

The present invention relates to devices for limiting the speed of a motor vehicle after one set of dual brakes has become ineffectual to cause the vehicle to be operated at no more than a slow, safe speed until the brakes can be repaired.

SUMMARY OF THE INVENTION

In the present invention a piston is freely movable in a compensating cylinder with the compensating cylinder having its opposite ends connected to the respective front and rear hydraulic brake systems. Application of the brakes should apply equal pressure to opposite ends of the piston so that it will remain in its balanced center position. Upon failure of either of the brake systems, such as a brake hose bursting, the piston will then move upon application of the brakes to the end of the cylinder having the defective brake system attached thereto and this will in turn release a spring-pressed stop member which engages the throttle valve to prevent the throttle valve from opening beyond a relatively slow speed setting.

The primary object of the invention is to provide a safety device for dual brakes in which the vehicle is restricted in speed upon failure of either of the two sets of brakes.

Other objects and advantages will become apparent in the following specifications when considered in light of the attached drawings.

DESCRIPTION OF THE PREFERRED EMBODIMENT

Figure 1:
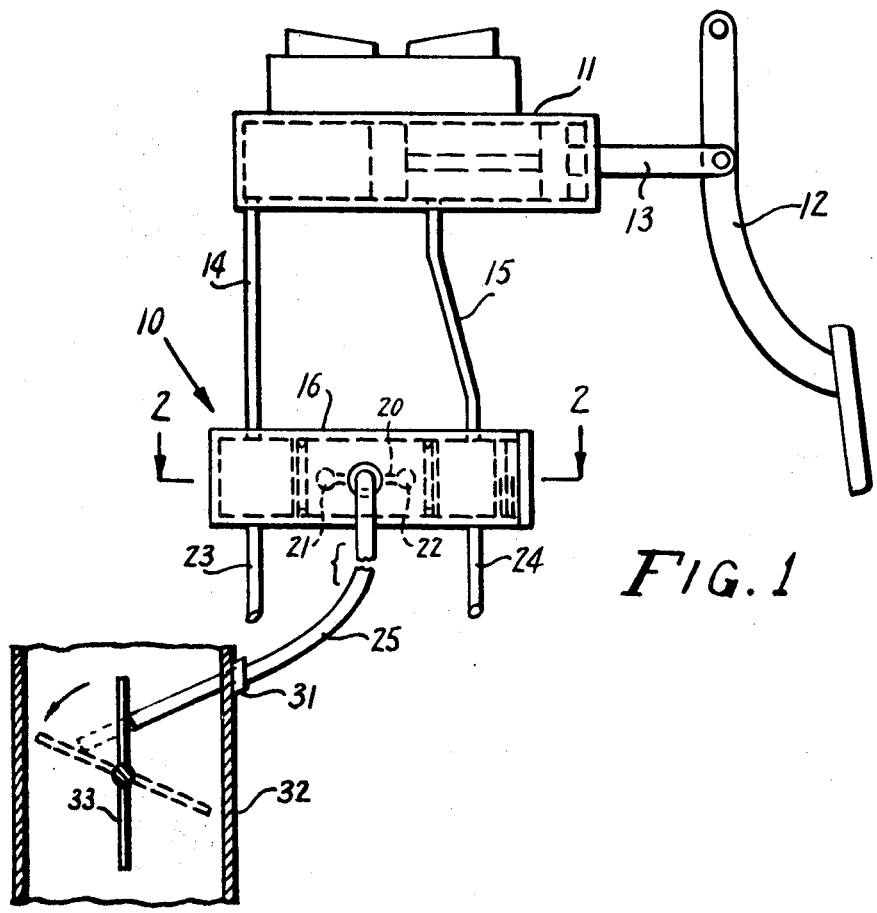
FIG. 1 is a side elevation of the invention shown partially broken away and in section for convenience of illustration.
Figure 2:
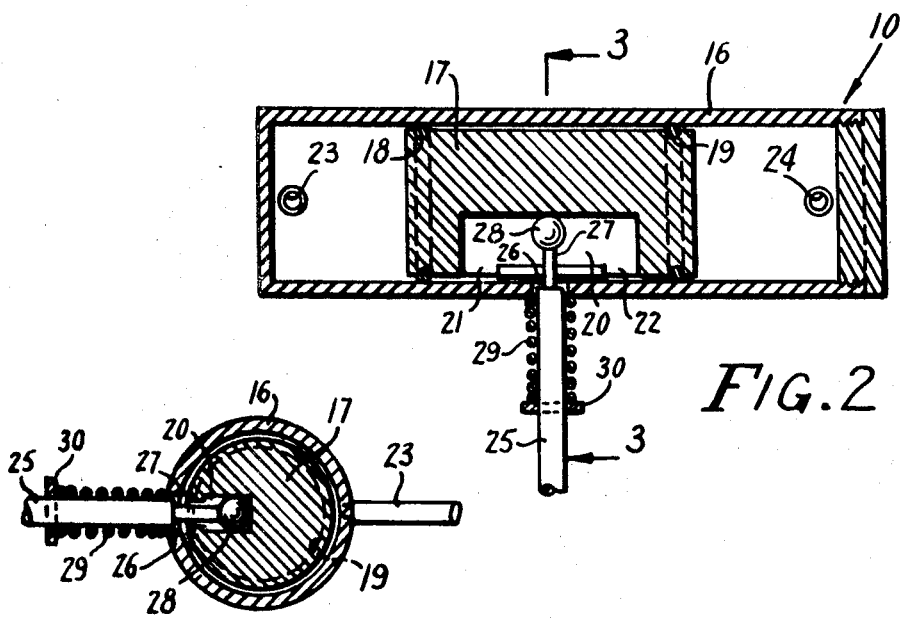
FIG. 2 is an enlarged fragmentary vertical sectional view taken along the line 2—2 of FIG. 1 looking in the direction of the arrows.
Figure 3:
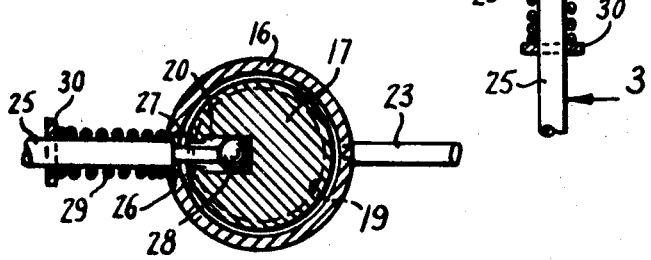
FIG. 3 is a transverse section taken along the line 3—3 of FIG. 2 looking in the direction of the arrows.

Referring now to the drawings in detail wherein like reference characters indicate like parts throughout the several figures, the reference numeral 10 indicates generally a safety system for dual brakes constructed in accordance with the invention.

The safety system for dual brakes 10 is adapted for use with the conventional dual master cylinder 11 actuated by a foot pedal 12 connected to the piston rod 13 of the master cylinder 11. A front brake hydraulic line 14 is connected to one cylinder of the dual master cylinder and a rear brake hydraulic line 15 is connected to the other cylinder of the dual master cylinder.

A compensating cylinder 16 has its opposite ends connected to the brake lines 14, 15 respectively and is provided with a piston 17 carrying O-ring seals 18, 19 in opposite ends thereof. The piston 17 is solid and has a T-slot 20 formed in one side thereof and extending longitudinally thereof. The T-slot 20 has openings 21, 22 at opposite ends thereof for reasons to be assigned. A front hydraulic brake line 23 is connected to the cylinder 16 at the same end thereof as the front brake line 14 and a rear brake line 24 is connected to the opposite end thereof adjacent the rear brake line 15. The brake lines 23, 24 extend respectively to the front and the rear brake systems of the motor vehicle in a conventional manner.

A flexible rod 25 extends through a bore 26 in the side of the cylinder 16 and carries a reduced diameter neck 27 terminating in a spherical head 28. The spherical head 28 fits into the T-slot 20 to prevent the head 28 from being withdrawn from the T-slot 20 except when the head 28 is opposite one of the openings 21 or 22 when the piston 17 is at one end of its travel in the cylinder 16. A compression coil spring 29 surrounds the flexible rod 25 engaging at one end the cylinder 16 and at the opposite end a washer 30 fixed to the rod 25. The function of the compression coil spring 29 is to press against the washer 30 normally urging the spherical head 28 outwardly of the T-shaped slot 20 so that upon movement of the piston 17 to one end of the cylinder 16 the rod 25 will be pulled completely from the piston 17.

The rod 25 passes through a bushing 31 in the throttle conduit 32 to engage the throttle valve 33 as illustrated in full and dotted lines in FIG. 1. Upon release of the head 28 from the piston 17 the spring 29 pulls the head 28 out of the piston 17 permitting the rod 25 to move from the solid line position of FIG. 1, wherein the valve 33 is fully open, to the dotted line position of FIG. 1, wherein the throttle valve 33 may be partially opened thus operating the motor vehicle at very slow comparative speeds. After the compensating cylinder 16 and piston 17 have been actuated to release the rod 25 the vehicle can only be driven at slow speeds until repairs are made. The fact that the throttle valve will not open beyond the slow speed position is a clear indication to the driver that repairs are necessary and he can still control the car sufficiently well to drive it at slow speeds to a garage for repairs. In the process of making the repairs the head 28 of the rod 25 is again inserted in the T-shaped slot 20 so as to release the throttle valve 33 from obstruction.

Having thus described the preferred embodiment of the invention, it should be understood that numerous structural modifications and adaptations may be resorted to without departing from the spirit of the invention.

What is claimed is:

1. A safety system for dual brakes of the type having a dual master cylinder respectively controlling the front and rear brakes of a motor vehicle comprising a compensating cylinder, a piston mounted for free reciprocation in said cylinder, a hydraulic brake line extending from one end of said dual master cylinder to one end of said compensating cylinder and a second hydraulic line extending from said one end of said compensating cylinder to the front brakes of the motor vehicle, a third hydraulic line extending from the other end of said dual master cylinder to the other end of said compensating cylinder, a fourth hydraulic line extending from said other end of said compensating cylinder to the rear brakes of a motor vehicle, means released by movement of said piston to either end of said compensating cylinder for restricting movement of the throttle valve of the engine.

2. A device as claimed in claim 1 wherein the means actuated by movement of said piston comprises a flexible rod detachably connected to said piston with said piston in balanced position and disconnected from said piston when said piston is at either end of its stroke.

3. A device as claimed in claim 2 wherein the means for disconnecting said rod from said piston includes resilient spring means normally urging said rod away from said piston.

4. A device as claimed in claim 3 wherein the means releasably connecting said rod to said piston includes a T-shaped slot in said piston extending longitudinally thereof and a spherical head formed on said rod and extending into said T-shaped slot.

5. A device as claimed in claim 1 wherein the means restricting the motion of said throttle valve comprises the opposite end of said flexible rod extending into the path of said throttle valve.